July 31, 1956  G. A. PETROSSIAN  2,756,716
ENGINE OIL CHECKING ROD
Filed Sept. 24, 1954
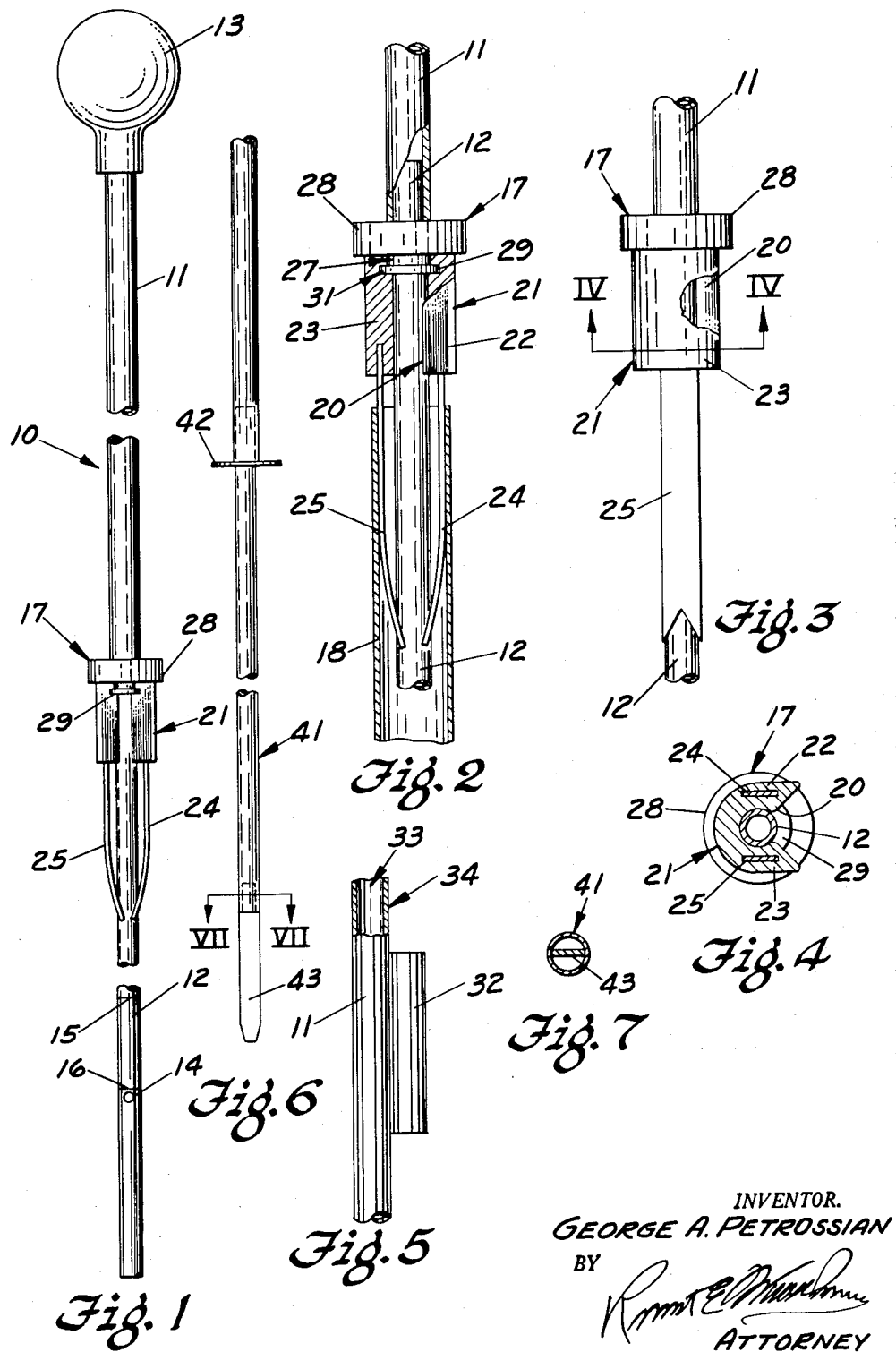
INVENTOR.
GEORGE A. PETROSSIAN
BY
ATTORNEY United States Patent Office 2,756,716
Patented July 31, 1956

2,756,716

ENGINE OIL CHECKING ROD

George A. Petrossian, Ann Arbor, Mich.

Application September 24, 1954, Serial No. 458,213

4 Claims. (Cl. 116—118)

This invention relates in general to a device for checking the oil content of an engine crank case and more particularly to a type thereof which is removably receivable into the dip stick opening of an engine block and whereby the oil content of said crank case may be visibly ascertained.

This is a continuation-in-part of my application Serial No. 385,406, filed October 12, 1953, for An Engine Oil Checking Rod.

Practically any person who has driven an automobile is fully aware of the difficulties and dirtiness usually involved in checking the quantity of oil in an engine crank case. If the conventional and virtually universal dip stick method is used to determine the oil content of said crank case, said dip stick must first be removed from the dip stick opening and cleaned. Then the dip stick is returned into the dip stick opening and the level of the oil in the crank case is determined by again removing the dip stick and observing the high point of the oil on said dip stick. Particularly in darkness, it is difficult to locate the dip stick opening in the engine block and even more difficult to see the oil level mark on the stick. The job of cleaning off the dip stick, in order to get an accurate level of the oil thereon, is a messy job and it is not uncommon that the dip stick is accidentally left out of the dip stick opening and becomes lost after the checking operation is completed. Also, the dip stick is often not properly seated in the dip stick opening, after removal for cleaning, and an inaccurate oil level mark is recorded on the stick. Other similar and related problems exist but are too obvious and too well known to warrant detailed discussion. It is of peculiar interest to note, however, that in spite of these problems the dip stick is still the standard method of checking the oil content of a crank case.

Accordingly, a primary object of this invention is the provision of a device whereby the above-mentioned problems involved in removing and cleaning a conventional dip stick in order to determine the oil level of a crank case can be completely eliminated, while still accurately determining the oil level of said crank case.

A further object of this invention is the provision of a device, as aforesaid, which can be easily and accurately adjusted or modified to fit engines of different makes.

A further object of this invention is the provision of a device, as aforesaid whereby the oil content of an engine crank case can be determined accurately and more quickly than previously possible with the conventional dip stick without the need of any additional equipment such as cleaning rags, flash lights and so forth, regardless of whether in daylight or night time.

A further object of the invention is the provision of a device, as aforesaid, whereby the condition of the oil in the crank case can be determined by easy reference to a sample.

A further object of this invention is the provision of a device, as aforesaid, in which it can be easily and accurately determined when oil must be added to the crank case, and the possibility of errors in such determination is eliminated or greatly reduced.

Other objects and purposes of this invention will become apparent to persons acquainted with this type of equipment upon reading the following specification and referring to the accompanying drawings, in which:

Figure 1 is a broken side elevation view of my engine oil checking rod.

Figure 2 is a broken fragmentary side elevation view of the center portion of my checking rod including a portion of a conventional dip stick opening with which my checking rod is cooperable.

Figure 3 is a fragmentary, broken side view of the portion of said checking rod shown in Figure 2, rotated 90 degrees about its vertical axis.

Figure 4 is a sectional view taken along the line IV—IV of Figure 3.

Figure 5 is a fragmentary, broken view of the upper tube of Figure 1 in a modified form.

Figure 6 is a broken, side view of an alternate structure for the lower, rigid portion of said checking rod.

Figure 7 is a sectional view taken along the line VII—VII of Figure 6.

In meeting those objects and purposes set forth above, as well as others related thereto, I have provided an elongated tube having an upper, transparent, resilient portion and a lower rigid portion which portions are secured together and co-axial. A stop member is mounted on said elongated tube approximately at the junction of the upper resilient and lower rigid portions thereof. A resilient bulb is attached to the upper end of the resilient portion and an opening is provided in the sidewall of the rigid portion near the lower end thereof, in a preferred embodiment thereof. An adapter is disconnectably attachable to the rigid portion just below the stop member.

For convenience in description, the terms "upper," "lower," "inner," "outer" and derivatives thereof will have reference to the checking rod and its geometric center as appearing in Figure 1. The terms "front," "side" and derivatives thereof will have reference to the adapter as appearing in Figures 2 and 3, respectively.

*Construction*

As shown in Figure 1, the checking rod 10 is comprised of an upper, transparent, resilient tube 11 and a lower rigid tube 12 which is secured to, communicates with and is co-axial with said upper tube 11. In this particular embodiment, the upper tube 11 is made from a transparent, resilient plastic which is impervious to oil, such as methyl methacrylate, and the lower tube 12 is made from a non-rusting metal such as brass. However, these materials may be changed as desired or required within the scope of this invention. A flexible bulb 13 made of material impervious to oil, such as the synthetic rubber commercially known as "neoprene," is attached to the upper end of the upper tube 11 and communicates therewith. Said bulb is of sufficient capacity to remove substantially all of the air from the upper and lower tubes 11 and 12, whereby oil may be drawn up into the transparent upper tube 11. The lower tube 12 is provided with one or more oil openings 14 near the lower end thereof. Alternatively, as illustrated in Figures 6 and 7 by way of example, it is possible to terminate the lower tube 12 at the point where said oil opening 14 is located in Figure 1, thereby eliminating the need for a separate opening in the sidewall of said lower tube. The preferred embodiment, however, has the oil opening in the sidewall of the lower tube 12 as shown. In the preferred embodiment, the oil opening will be at such a level that it will be submerged in oil until the oil quantity is down one quart or more.

High and low level oil marks 15 and 16 may, if desired, be scribed upon the outside of the lower tube 12 in the vicinity of the oil opening 14, in a substantially conventional manner.

A stop member 17, which in this embodiment is an annular element, is secured to the rod 10, as by welding, molding or pressing, approximately at the junction of the upper and lower tubes. Since member 17 is spaced from the oil opening 14 a preselected and predetermined distance. This distance is normally somewhat greater than the distance between the upper end of a conventional dip stick opening 18 (Figure 2) and the desired, minimum oil level of its corresponding crank case in a selected group of engines. By means of the adapter 21 (Figures 2, 3 and 4) this said distance may be reduced so that the oil opening 14 will be in exactly the right position within the crank case of the particular make or type of engine with which this particular checking rod is to be used. It will be recognized, of course, that a different checking rod may be provided for each type of engine and thereby eliminate the need for an adapter 21.

The exact structure of the adapter 21 may vary considerably. However, in this particular embodiment said adapter 21 is substantially channel shaped and, as shown in Figure 4, its legs 22 and 23 have opposed ridges 20 intermediate the inner and outer edges thereof for gripping the lower tube 12 therebetween. Said adapter 21 is made preferably of a resilient plastic or similar material which is not materially altered by hydrocarbon oil. Two or more positioning arms 24 and 25 are imbedded in the lower end of the adapter 21 and extend downwardly therefrom as shown in Figures 2 and 3. Said positioning arms curve inwardly toward each other to engage the lower tube 12 on the opposite sides thereof. As shown in Figure 2, the positioning arms 24 and 25 hold the checking device snugly but removably within the opening in the dip stick opening 18 in a desired position, while permitting the adapter 11 to seat firmly against the upper end of said dip stick opening 18.

As shown in Figure 2, the stop member 17 may be an annular element secured to the checking rod 10 and having a lower portion of reduced diameter. An annular groove 27 in said lower portion adjacent the enlarged upper portion 28 provides a flange 29. The adapter 21 is provided with an annular groove 31 near the upper end thereof corresponding to the flange 29 for receiving same and thereby locking the adapter 21 in position adjacent the stop member 17 and against axial movement with respect thereto.

As shown in Figure 5, a sample tube 32, which may be made of a transparent material substantially identical with that used in the resilient upper tube 11, is secured to said upper tube and is prefilled with oil having the proper coloring to show oil requiring changing. Thus, when oil is drawn into the upper transparent tube 11 a quick visual comparison can be made with the oil in the sample tube 32 to determine whether an oil change is necessary. One side of the inner wall 33 or outer wall 34 of the upper resilient tube 11 may be coated with a phosphorescent material so that the oil in the transparent upper tube 11 can be seen at night.

The alternate structure disclosed in Figures 6 and 7 provides a modified lower tube 41 which may be substantially the same as tube 12 except that it is terminated at a distance from its stop collar 42 corresponding to that at which the tube 12 is provided with a sidewall opening 14. A spacer element 43 of predetermined length is inserted into the lower, open end of the tube 14. Said spacer is designed to leave at least a portion of the lower, open end of said tube 41 unrestricted. If a flat spacer 43 is used, as shown, it provides a convenient place to indicate the type engine for which a particular checking rod is adapted.

*Operation*

The distance between the stop member 17 and the oil opening 14 is preselected to exceed the normal depth of the oil level from the top of the dip pipe 18 in a conventional crank case of several different makes of engine of about the same size. An adapter 21 is provided for each engine in this group and is applied to the rod 10 by embracing the lower tube 12 adjacent the stop member 17 with the legs 22 and 23 of said adapter 21. Said ridges 20 snap around the tube 12 and prevent accidental disengagement. The flange 29 and cooperating groove 31 prevent accidental axial displacement of the adapter 21 from the member 17. During such mounting of the adapter, the flexible positioning arms 24 and 25, are spread apart so that they will also embrace the lower tube 12 when the adapter 21 is in proper position, as shown in Figures 2 and 3.

The checking rod 10, which is now ready for use, is inserted into the dip stick opening 18 until the adapter 21 is snugly seated adjacent the upper end of said opening in a conventional manner. When the adapter is thus resting adjacent the upper end of the dip stick opening, the oil opening 14 is at the minimum oil level, such as the one quart low level, within the crank case for proper operation of the engine. If the oil in the crank case is below the oil opening 14, compression and then release of the bulb 13 will not draw oil up into the transparent upper tube 11. This will clearly indicate that oil must be added. If a visual check is desired to make sure that the checking rod is operating accurately, it can be removed from the dip stick opening 18 in a conventional manner and the oil level thereon may be visually observed.

If the oil quantity is adequate in the crank case, the oil will be drawn into the upper transparent tube 11 when the bulb 13 is released after having been compressed and the sufficiency of oil in the crank case will be unquestionably apparent. While the oil is visible in the transparent tube 11, it may be compared for coloring with the sample in the sample tube 32. It is not necessary to discharge from the rod the small amount of oil drawn thereinto during the check. If the engine vibrations do not cause this oil to drain out, it will be removed when the bulb 13 is again compressed and the test repeated in the same manner, as above described, at a later time.

The alternate structure of Figures 6 and 7 permits substantially the same operation as described hereinabove. The opening at the lower of the tube has portions on either side of said spacer 43 which in their operative respect correspond to the openings 14 in the form of the invention shown in Figures 1 to 5.

It can be easily seen from the drawings and the above description that the device of my invention is simple, accurate, easy to operate and involves no messy problems presently identified with the conventional dip stick method of checking the oil content of a crank case.

Although particular, preferred embodiments of my invention have been disclosed herein for illustrative purposes, it will be understood that modifications or variations which do not depart from the spirit and scope of such invention, are fully contemplated as defined in the appended claims.

I claim:

1. In an engine oil checking device removably receivable into the dip stick opening of an engine block, the combination comprising: an elongated tube receivable within said dip stick opening; an oil opening in the said tube intermediate the ends thereof; a stop member secured to said tube and spaced a selected distance from said oil opening; adapter means disconnectably secured to said tube for reducing said selected distance by a predeterminable amount, said adapter means being engageable with said engine block at said dip stick opening; and a suction bulb secured to the upper end of said tube, at least a section of the upper portion of said device being transparent.

2. The structure of claim 1 in which: said adapter means is a channel shaped member whose legs snugly, but releasably, embrace said tube, the inner walls of said adapter having a transverse annular groove therein near one end thereof; said stop member has a portion of reduced diameter and an annular flange thereon receivable into said annular groove when said adapter one end is adjacent the enlarged portion of said stop member; and a pair of flexible arms are secured to, and extend in substantially the same direction from, the other end of said adapter, said arms curving toward each other and engaging at their extended ends said tube.

3. In an engine oil checking device removably receivable into the dip stick opening of an engine block, the combination comprising: an elongated member receivable within said dip stick opening; said elongated member being tubular from the upper end thereof at least to a point intermediate the upper and lower ends thereof; ports in said member intermediate the ends thereof and communicating with said tubular portion and a suction bulb secured to said upper end of said elongated member, at least a section of the upper portion of said engine oil checking device being transparent.

4. In an engine oil checking device removably receivable into the dip stick opening of an engine block, the combination comprising: an elongated tube receivable within said dip stick opening; a spacer mounted in the lower end of said tube and extending therebeyond, said spacer being spaced from the sidewall of the tube to define an oil opening; a stop member secured to said tube and spaced a selected distance from the lower end of said tube; adapter means disconnectably secured to said tube for reducing said selected distance by a predeterminable amount, said adapter means being engageable with said engine block at said dip stick opening; and a suction bulb secured to the upper end of said tube, at least a section of the upper portion of said device being transparent.

References Cited in the file of this patent

UNITED STATES PATENTS

| | | |
|---|---|---|
| 1,609,911 | Marsh | Dec. 7, 1926 |
| 2,016,832 | Hyatt et al. | Oct. 8, 1935 |
| 2,302,884 | O'Neill | Nov. 24, 1942 |
| 2,363,424 | Keenan | Nov. 21, 1944 |